US007818757B1

(12) United States Patent
Tsimelzon et al.

(10) Patent No.: US 7,818,757 B1
(45) Date of Patent: Oct. 19, 2010

(54) METHOD FOR GUARANTEEING PROCESSING OF MESSAGES IN A CONTINUOUS PROCESSING SYSTEM

(75) Inventors: Mark Tsimelzon, Sunnyvale, CA (US);
Aleksey Sanin, Sunnyvale, CA (US);
Alexander Zeyliger, Redwood City, CA (US)

(73) Assignee: Sybase, Inc., Dublin, CA (US)

( * ) Notice: Subject to any disclaimer, the term of this patent is extended or adjusted under 35 U.S.C. 154(b) by 1038 days.

(21) Appl. No.: 11/487,796

(22) Filed: Jul. 17, 2006

Related U.S. Application Data

(60) Provisional application No. 60/700,138, filed on Jul. 18, 2005.

(51) Int. Cl.
*G06F 3/00* (2006.01)
*G06F 9/44* (2006.01)
*G06F 9/46* (2006.01)
*G06F 13/00* (2006.01)
*G06F 11/00* (2006.01)
*G06F 15/16* (2006.01)

(52) U.S. Cl. ............... 719/321; 709/231; 714/13; 719/314

(58) Field of Classification Search ............... None
See application file for complete search history.

(56) References Cited

U.S. PATENT DOCUMENTS 6,920,598 B2 * 7/2005 Chen et al. ............... 714/748
2007/0088970 A1 * 4/2007 Buxton et al. ............ 714/2
2008/0126445 A1 * 5/2008 Michelman ............... 707/204

* cited by examiner

*Primary Examiner*—Hyung S Sough
*Assistant Examiner*—Tuan Dao
(74) *Attorney, Agent, or Firm*—Sterne, Kessler, Goldstein & Fox P.L.L.C.

(57) ABSTRACT

A method for processing messages ensures that every message that enters a continuous processing system is fully processed in its entirety, even in the event of a failure within the system. Messages are pushed through an execution plan that includes a set of connected "primitives" that process the message, where the primitives may be distributed across a group of servers. Messages are pushed through in accordance with a protocol that does not permit unprocessed messages to be permanently lost as they travel from input sources, between primitives, and to output sources within the execution plan. The input queue, output queue, and state (if any) associated with each primitive are saved in persistent storage at select checkpoints. If a failure occurs on a server, the server, after it starts up again, restores the primitives on that server to the input queues, output queues, and states saved at the last applicable checkpoint.

22 Claims, 6 Drawing Sheets

METHOD FOR GUARANTEEING PROCESSING OF MESSAGES IN A CONTINUOUS PROCESSING SYSTEM

RELATED APPLICATIONS

This application claims the benefit of U.S. Provisional Application No. 60/700,138, filed on Jul. 18, 2005 with first-named inventor Mark Tsimelzon, and titled "Guaranteed Processing of Data Streams in a Continuous Processing System," the contents of which are incorporated by reference as if fully disclosed herein.

BACKGROUND OF THE INVENTION

1. Field of the Invention

This invention relates generally to continuous processing systems that process streaming data, and, more specifically, to a method for guaranteeing processing of messages in a continuous processing system.

2. Description of the Background Art

Various forms of consistent, durable, and complete processing have been around for years with respect to systems that process static data. Such systems ensure complete processing of data by processing the data within a transaction, where the transaction includes all the steps needed to fully process the data. The classic book on transactions is "Transaction Processing: Concepts and Techniques" by Jim Gray and Andreas Reuter. Data processed within a transaction is only considered to be processed if the entire transaction is completed. If a system failure prevents the transaction from being completed, the relevant data is processed again within a new transaction.

For systems that process static data, data can easily be retrieved again from the database in the event of a system failure and reprocessed in a new transaction. It is far more complicated to ensure complete processing of data in a continuous processing system, where streaming data is continuously pushed through a set of connected primitives that are dependent on each other and that have continuously changing states. Known solutions for ensuring complete processing do not apply to continuous processing system. Therefore, there is need for a method to ensure processing of streaming messages in a continuous processing system.

SUMMARY

The present invention provides a method for ensuring that every message that enters a continuous processing system is fully processed in its entirety, even in the event of a failure within the system. Messages are pushed through an execution plan that includes a set of connected "primitives" that process the messages, where the primitives may be distributed across a group of servers.

Messages are pushed through in accordance with a protocol that (1) enables messages to identified messages uniquely over a connection and (2) does not permit unprocessed messages to be permanently lost as they travel through the execution plan. Such protocol specifies that a sender of a message saves a copy of the message in persistent storage (or retains the ability to regenerate the message) until at least the recipient of the message has saved a copy in persistent storage. In one embodiment, messages sent over a connection are identified by a sequence number that corresponds to the sequence order in which the messages are generated and sent. A flow of messages from a source to a destination is called a "connection."

A primitive may be associated with a state. For each primitive associated with a state, the state of the primitive is updated after (and only after) the primitive fully processes the messages it receives.

Messages received by a primitive are buffered in an input queue until they are processed, and outbound messages are buffered in an output queue. The input queue, output queue, and state (if any) associated with each primitive are saved in persistent storage at select checkpoints. Checkpoints need not be synchronized across primitives or servers (e.g., each server or primitive can save at checkpoints independent of each other).

If a failure occurs on a server, the server, after it starts up again, restores the primitives on that server to the input queues, output queues, and states saved at the last applicable checkpoint. After failure recovery, each primitive on such server continues processing starting from the last-saved checkpoint for that primitive.

The state of the primitive after the failure will not reflect any messages that were processed after the checkpoint. If such messages were received prior to the checkpoint, those messages will appear in the input queue and will be reprocessed by the primitive in the same order they were originally processed. If such messages were received after the checkpoint, the sender of the messages will resend such messages, and the primitive will reprocess them in the same order they were originally processed. A recovered primitive eventually becomes aligned (i.e., it reaches eventual agreement) with neighboring primitives, input sources, and/or output destinations by communicating with each of such neighboring components about which messages have been sent and received over the connection between the recovered primitive and the neighboring component.

DETAILED DESCRIPTION OF THE PREFERRED EMBODIMENTS

Figure 1:
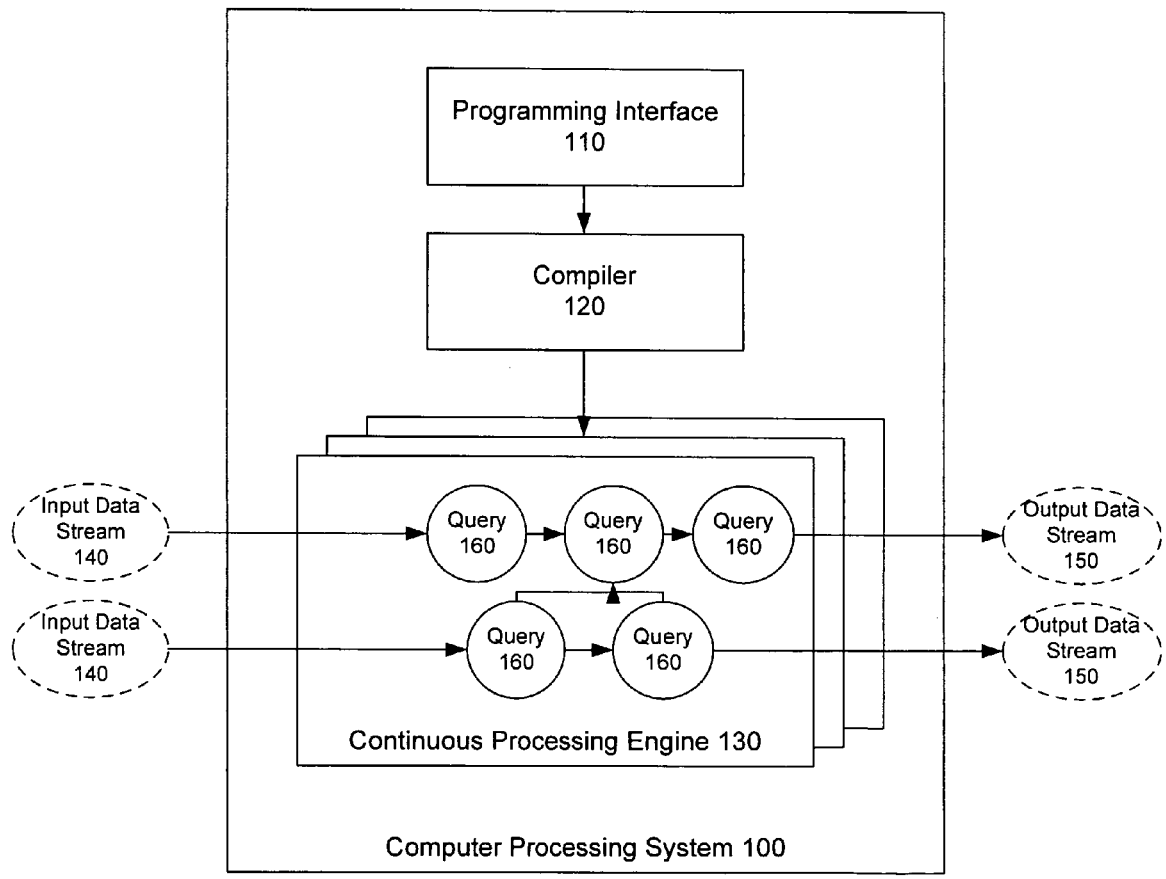
FIG. 1 is a block diagram of a continuous processing system.

FIG. 1 illustrates an example of a continuous processing system that processes streaming data. The system 100 includes a programming interface 110, a compiler 120, and a continuous processing engine 130, where the engine may be distributed over a cluster of servers. The programming interface 110 enables programmers to write queries, which are then complied by the compiler 120 and provided to the continuous processing engine 130. The queries 160 subscribe to input data steams 140 and publish to output data streams 150. Through the engine 130, the queries 160 operate on input data stream continuously.

When the compiler 120 compiles a set of queries, an execution plan is created for executing the queries. In some cases, the execution plan comprises a set of connected "primitives" that process the messages. Examples of primitives include filters, aggregators, and windows.

Figure 2:
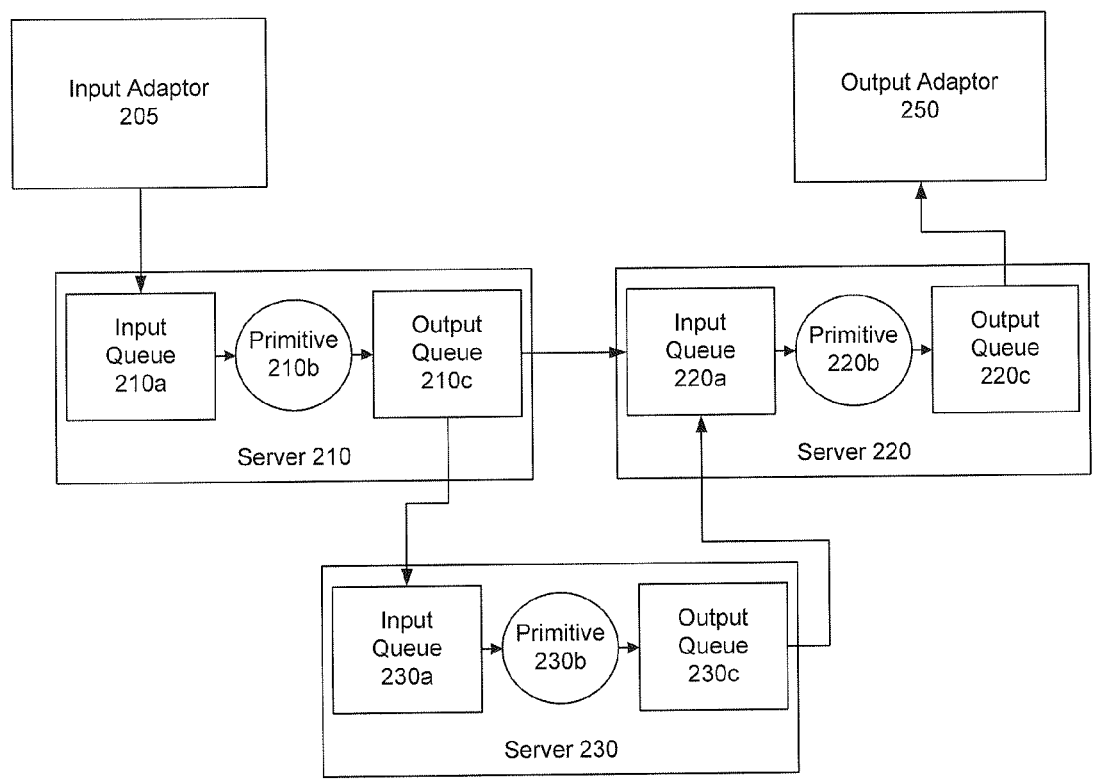
FIG. 2 is a block diagram that illustrates an example of an execution plan.

FIG. 2 illustrates an example of an execution plan. The execution plan includes primitives 210b, 220b, and 230b on servers 210, 220, and 230. Each primitive is associated with an input queue (210a, 220a, 230a) and an output queue (210c, 220c, 230c).

An input source (e.g., an input adaptor) 205 for streaming messages sends the messages to server 210, and primitive 210b processes such messages. Primitive 210b generates output messages which are sent to primitives 220b and 230b on servers 220 and 230, respectively. Primitive 230 publishes messages to destination output 250 (e.g., an output adaptor).

Coral8, Inc.'s "In-Motion Processing System" is an example of a continuous processing system. Also, one embodiment of a continuous processing system is described in U.S. patent application Ser. No. 11/015,963, filed on Dec. 17, 2004 with Mark Tsimelzon as the first-named inventor, and titled "Publish and Subscribe Capable Continuous Query Processor for Real-time data streams," the contents of which are incorporated by reference as if fully disclosed herein.

Queries may be written in a continuous-processing software language (CPL), which is sometimes also referred to as a continuous correlation language (CCL). An example of such a language described in the U.S. patent application Ser. No. 11/346,119, filed on Feb. 2, 2006, and titled "Continuous Processing Language for Real-time Data Streams," the contents of which are incorporated by reference as if fully disclosed herein.

Figure 3:
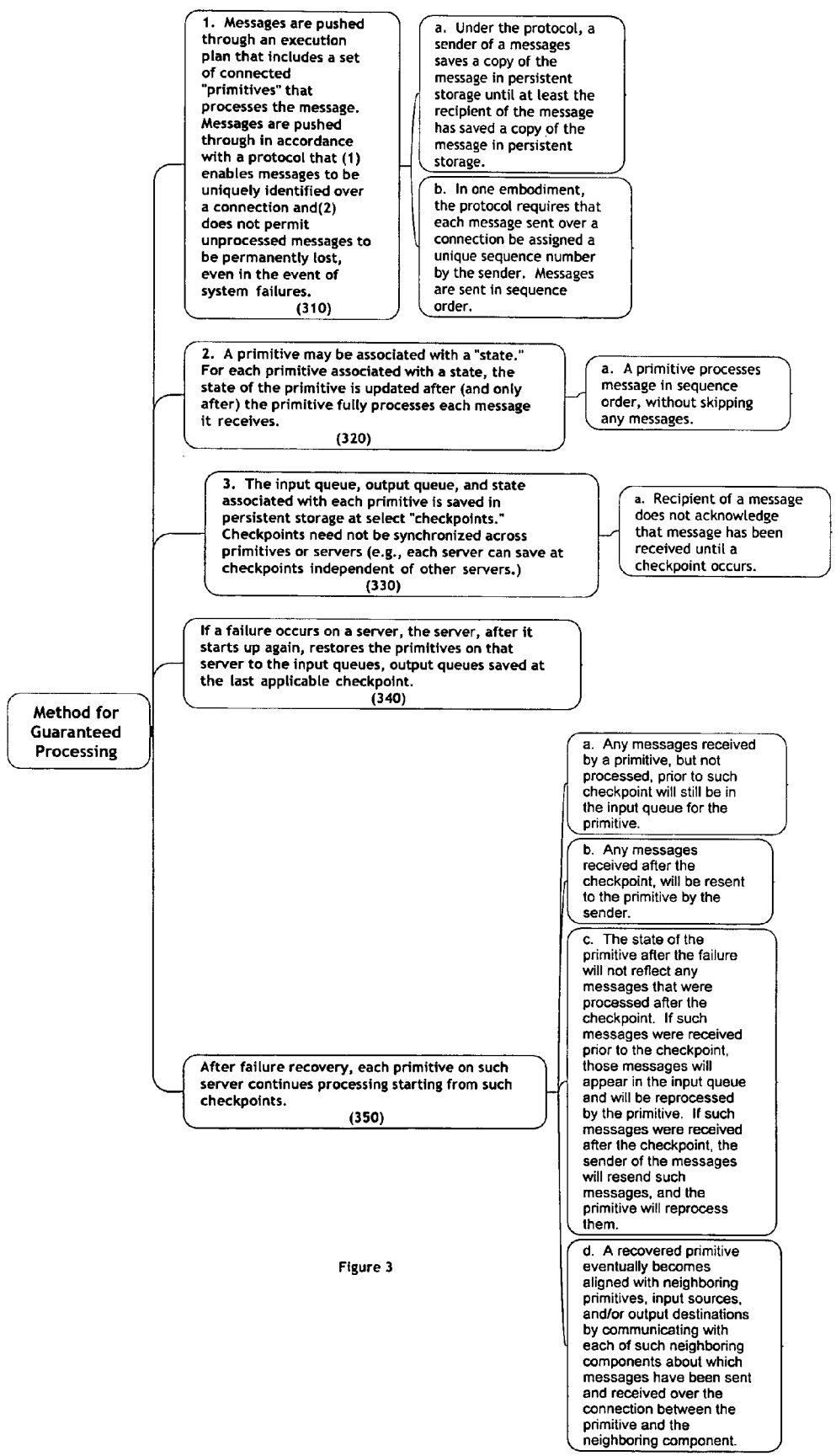
FIG. 3 is a mind map that illustrates a method for guaranteed processing in a continuous processing system.

FIG. 3 illustrates a method for ensuring that every message that enters a continuous processing system is fully processed in its entirety, even in the event of a failure within the system. As discussed above, messages are pushed through an execution plan that includes a set of connected primitives that process the message (310). The primitives may be distributed across a plurality of servers.

Also, messages are pushed through in accordance with a protocol (referred to as a "guaranteed delivery" protocol herein) that (1) enables messages to be identified uniquely over a connection and (2) does not permit unprocessed messages to be permanently lost, even in the event of system failure (310). Messages can be lost over a connection, but the sender will have the ability to resend lost messages until the recipient indicates that it will never need a message again. Under the protocol, a sender of a message saves a copy of the message in persistent storage (or retains the ability to regenerate the message) until at least the recipient of the message has saved a copy in persistent storage (310a). In one embodiment, the recipient of a message acknowledges when a message has been received and when it has been "processed." In such case, "processed" does not necessarily mean the message has been fully processed, but rather that it has at least been saved in persistent storage. In this embodiment, the sender of the message only deletes the message after the recipient acknowledges that it has processed the message. This embodiment is described in more detail with respect to FIG. 4.

In one embodiment of the protocol, each message sent over a connection in the execution plan is assigned a unique sequence number by the sender of the message, thereby enabling messages to be identified uniquely in communications between the sender and the receiver (310b). The sequence numbers correspond to the order in which the sender generates and sends the messages and the order in which the messages need to be processed by the recipient. Messages are sent in increasing sequence order. The sending of messages in increasing sequence order is only interrupted if one or more previously-sent messages need to be resent, and, if a batch of messages is being resent, messages within such batch will be resent in sequence order.

A primitive may be associated with a state. For each primitive associated with a state, the state of the primitive is updated after (and only after) the primitive fully processes the messages it receives (320). A primitive processes messages in sequence order without skipping any messages in the sequence (320a).

Messages received by a primitive are buffered in an input queue until they are processed, and outbound messages are buffered in an output queue. The input queue, output queue, and state associated with each primitive are saved in persistent storage (such as within a transaction) at select checkpoints (330). Checkpoints need not be synchronized across primitives or servers (e.g., each server or primitive can save at checkpoints independent of each other).

If a failure occurs on a server, the server, after it starts up again, restores the primitives on that server to the input queues, output queues, and states saved at the last applicable checkpoint. After failure recovery, each primitive on such server continues processing starting from the last-saved checkpoint for that primitive (350). Any messages received by a primitive, but not processed, prior to such checkpoint will still be in the input queue for the primitive (350a). Any messages received after the checkpoint, will be resent to the primitive by the sender of the messages, where the sender may be another primitive, an input source, or other entity in the execution plan (350b). A recovered primitive eventually becomes aligned with neighboring (and directly connected) primitives, input sources, and/or output destinations by communicating with each of such neighboring components about which messages have been sent and received over the connection between the recovered primitive and the neighboring component (350d).

The state of the primitive after the failure will not reflect any messages that were processed after the checkpoint. If such messages were received prior to the checkpoint, those messages will appear in the input queue and will be reprocessed by the primitive in the same order they were originally processed. If such messages were received after the checkpoint, the sender of the messages will resend such messages in order, and the primitive will reprocess them in the same order they were originally processed (350c).

Although checkpoints need not be synchronized across servers or primitives, they can be synchronized. There can be common checkpoints for the whole system (i.e., they are synchronized), where all the states, input message queues, and output message queues for the whole system are saved within one transaction at each checkpoint. After failure, this allows the whole system to be restored to a consistent state.

Figure 4A:
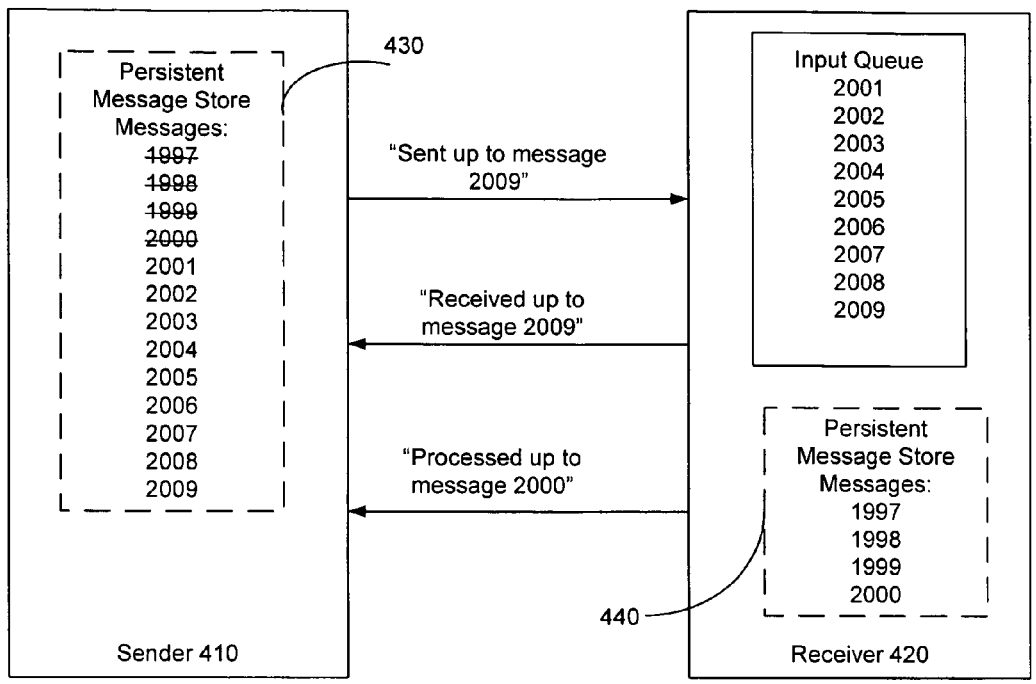
FIGS. 4a-b are diagrams that illustrate an example of a guaranteed delivery protocol.
Figure 4B:
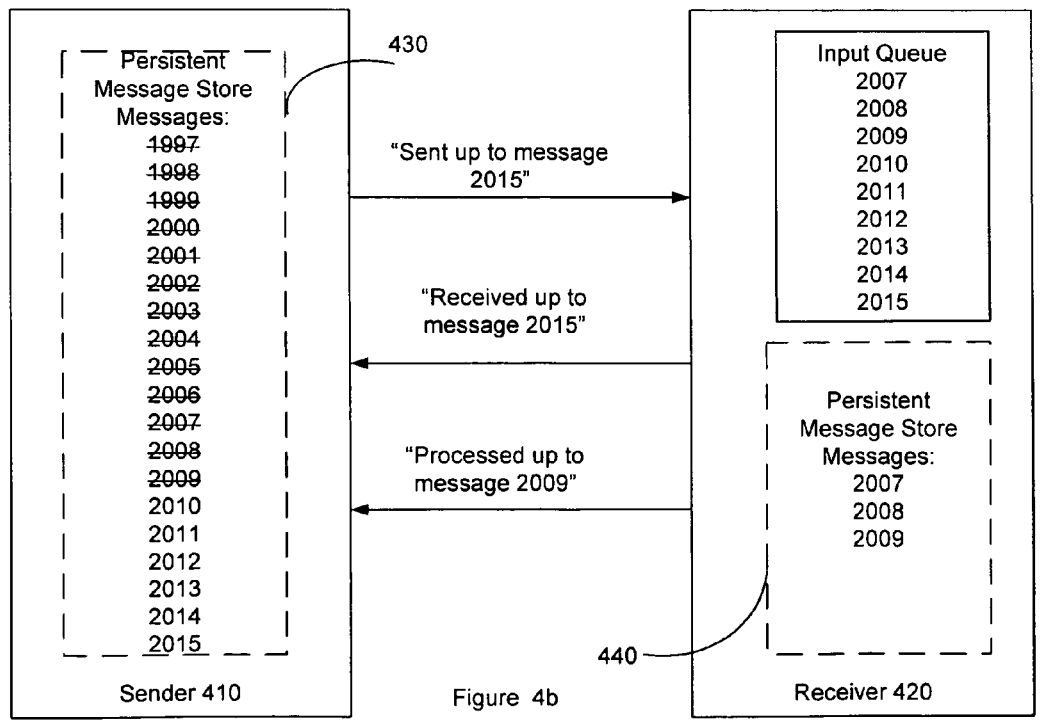

FIGS. 4a-b illustrate an example of sending messages in accordance with a "guaranteed delivery" protocol that does not permit unprocessed messages to be permanently lost. The protocol illustrated in FIGS. 4a-b is a request/response protocol. As stated above, a flow of messages from a source to a destination is called a "connection." In the illustrated protocol, message sequence numbers are used to uniquely identify messages and track the connection progress. Sequence numbers are assigned by the sender of the message (whether an input source, primitive, or other entity). Each message is assigned a unique sequence number corresponding to the order in which message are sent (and generated by the sender), where two messages having the same sequence number over a connection will be assumed to be the same message (i.e., a sequence number is never duplicated over a connection). The receiver relies on sequence numbers to monotonically and sequentially increase over a connection. Messages are always sent in sequence order. The sending of messages in increasing sequence order is only interrupted if one or more previously-sent messages need to be resent, and, if a batch of messages is being resent, messages within such batch will be resent in sequence order (i.e., the sequence is repeatable after failure).

When a receiver (i.e., a destination) receives a message from a sender (i.e., a source), it acknowledges receipt of the message. In the embodiment illustrated in FIGS. 4a-b, there are two kinds of acknowledgements: the "received" acknowledgement and the "processed" acknowledgement. If a receiver acknowledges a message as "received," this means that the sender need not resend the message unless specifically asked for by the receiver. If a receiver acknowledges a message as "processed," this means that the receiver will never ask for the message again (which means that the receiver has at least saved the message in its persistent storage), and the sender can permanently delete the message.

It is not necessary to have two levels of acknowledgement—one will suffice, but having two levels optimizes performance in most cases. This is because a recipient of a message can usually send a "received" acknowledgement faster than it can send a "processed" acknowledgment. By having both types of acknowledgement messages, a sender can find out if certain messages were not received (and thus need to be resent) before the time it normally takes a recipient to send a "processed" acknowledgement.

In the example illustrated in FIGS. 4a-b, a Sender 410 sends messages to a Receiver 420. In an execution plan, types of "senders" include an input source and a primitive. Types of "receivers" include an output destination and a primitive.

In FIG. 4a, sender 410 has sent receiver 420 messages up to message 2009. Sender 410 informs receiver 420 that it has sent messages up to message 2009. Receiver 420 informs Sender 410 that it has received up to message 2009 and processed up to message 2000. "Processing" in this context means that Receiver 420 has at least stored the messages in persistent storage (and, therefore, will never need the messages again from sender 410). It also can mean that Receiver 420 has fully processed messages, and, thus, no longer has a need for such message. Sender 410 retains in persistent storage 430 messages 2001-2009. Once Receiver 420 informs Sender 410 that it has processed message up to message 2000, Sender 410 can delete any message prior to message 2001 from persistent storage 430.

In FIG. 4b, Sender 410 has sent Receiver 420 messages up to message 2015. Sender 410 informs Receiver 420 that it has sent messages up to message 2015. Receiver 420 informs Sender 410 that it has received up to message 2015 and processed up to message 2009. Sender 410 retains in persistent storage 430 messages 2010-2015. Once Receiver 420 informs Sender 410 that it has processed message up to message 2009, Sender 410 can delete any message prior to 2010 from persistent storage 439. Note that Receiver 420 no longer has message prior to message 2007 in persistent storage 440 because Receiver 420 has fully processed messages up to 2006, and therefore, will not need these messages again.

Each message received by a primitive is processed in sequence order. In one embodiment, if an impermissible calculation or action occurs in the processing (such as dividing by zero), the primitive will not stop and send an error message. It will simply generate a null message or some other default message and continue processing messages. This is because in a continuous processing system, unlike a system that operates on a static data, stopping due to an error is often not permitted, as data continues to stream in.

Figure 5A:
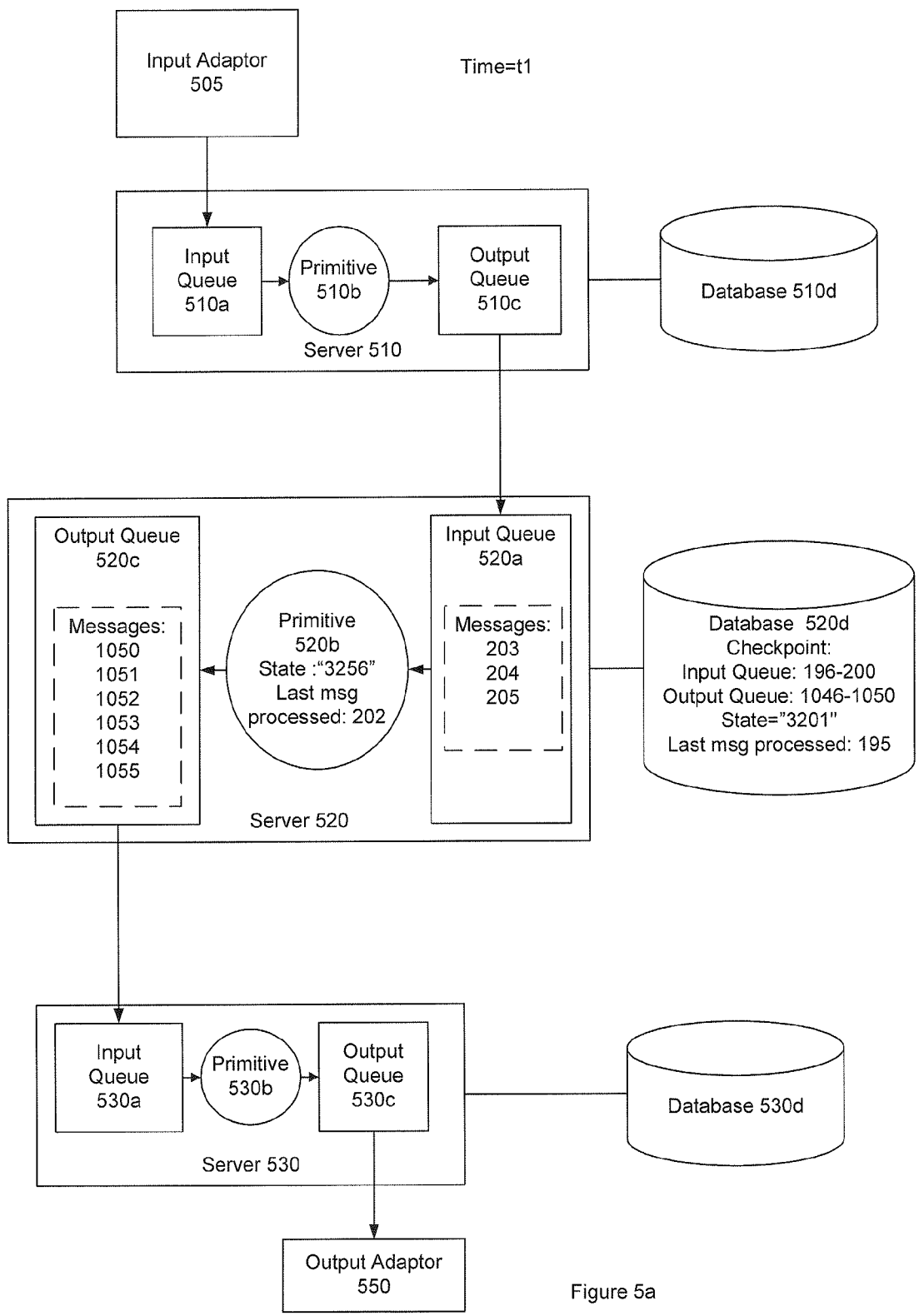
FIGS. 5a-5b are block diagrams that illustrate an example of how a continuous processing system implementing an embodiment of the invention recovers from a failure.
Figure 5B:
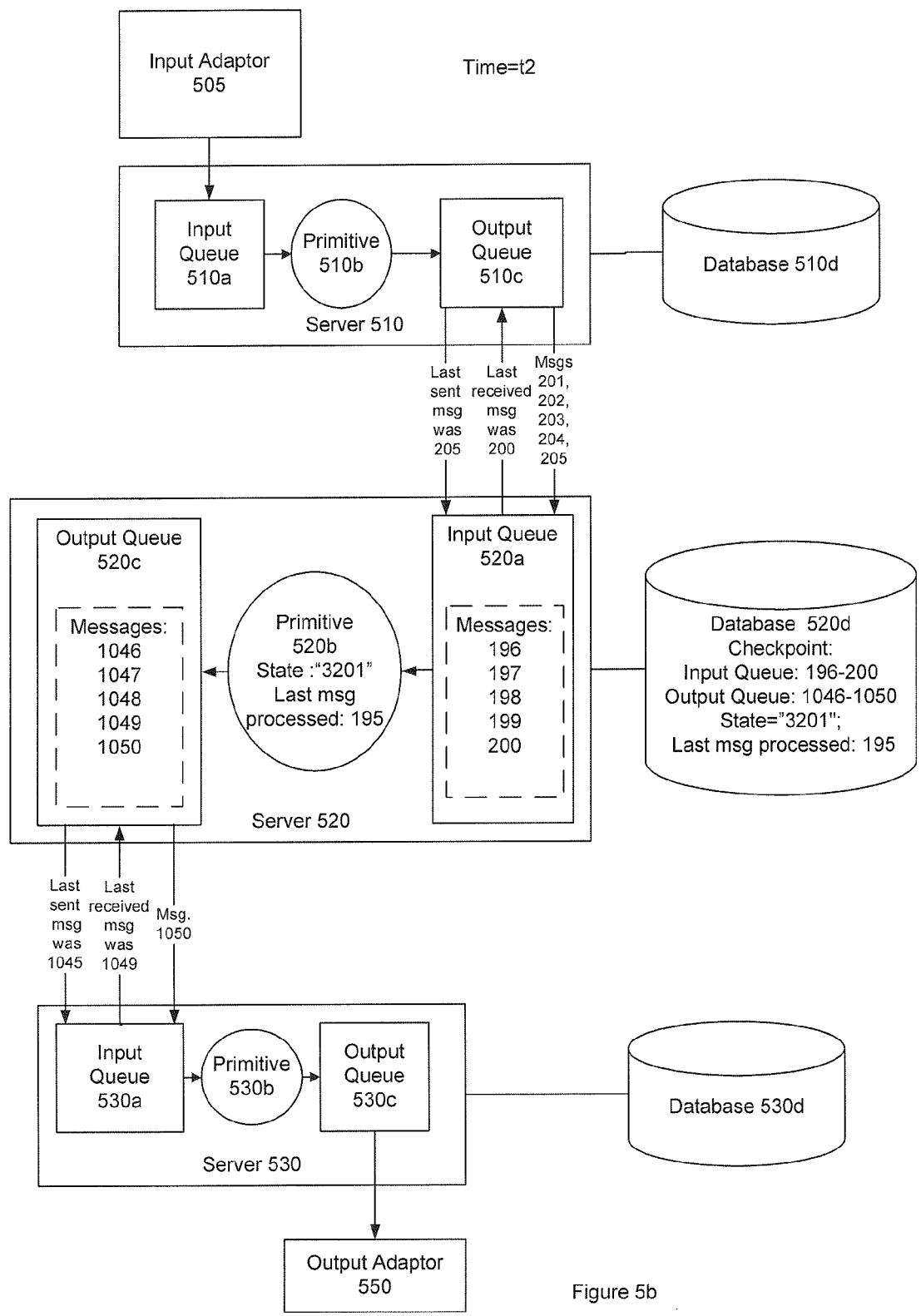

FIGS. 5a and 5b illustrate an example of how a system implementing an embodiment of the invention recovers from a failure. In the example illustrated in FIG. 5a, primitives 510b, 520b, and 530b reside on separate severs 510, 520, and 530. Input Adaptor 505 sends messages to primitive 510b, which sends messages to primitive 520b, which sends messages to primitive 530b, which sends messages to output adaptor 550. Each primitive is associated with an input queue (510a, 520a, 530a), output queue (510c, 520c, and 530c), and a database (510d, 520d, 530d) in which checkpoint data is persistently stored.

At time t1, primitive 520b has buffered messages 203-205 from primitive 510b in its input queue 520a. The state of primitive 520b after processing message 202 is "3256." Messages 1050-1055 are buffered in the output queue 520c. The last message sent to primitive 530b is message 1049.

Database 520d stores the last checkpoint saved for primitive 520b. At such checkpoint, input queue 520a had messages 196-200, output queue 520c had messages 1046-1050, and the state was "3201" after processing message 195.

FIG. 5b, illustrates the state of primitive 520b at time t2, which is immediately after a failure on server 520. Primitive 520b is restored to the state, input queue, and output queue saved at the last checkpoint (shown in database 520d in FIG. 5a). Upon recovery, primitive 520b is behind primitives 510b and 530b.

When server 520 restarts after failure, primitive 510b informs primitive 520b that the last message sent was message 205. Primitive 520b tells primitive 510b that the last message it received was message 200. Primitive 510b then resends messages 201-205. Primitive 510b is able to do this because it saves a copy of all messages it sends until primitive 520b acknowledges that it has processed the message (which, in this context, means that the message has at the very least been saved in database 520d at a checkpoint.) Primitive 520b then fully processes messages 196-205 (which means that primitive 520b is actually reprocessing messages 196-202, as these were processed before the failure, but after the last checkpoint).

If server 510 also failed, primitive 510b would be able to resend messages 201-205 because either (1) such messages were in output queue 510c at the time of the last checkpoint for server 510, or (2) if such messages were generated after the last checkpoint on server 510, primitive 510b has the ability to regenerate these messages because the appropriate input messages have been persistently saved (either by server 510 at the last checkpoint, or by the input source).

When server 520 starts up after failure recovery, primitive 520b informs primitive 530b that the least message sent was message 1045. Primitive 530b informs primitive 520b that the last message it received was message 1049. Primitive 520b then does not send primitive 530b messages 1046-1049 (which are in its output queue after failure recovery), and starts sending messages from message 1050. In an alternate embodiment, primitive 530b could resend messages 1046-1049 to primitive 530b, and primitive 530b would just discard these duplicate messages.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method for ensuring that messages in a distributed, continuous processing system are processed in their entirety, even in the event of a system failure, the method comprising:

pushing messages through a set of connected primitives that process the messages in accordance with an execution plan, where the primitives are distributed across a plurality of servers and where the messages are pushed through in accordance with protocol that does not permit unprocessed messages to be permanently lost and that enables messages to be identified uniquely over a connection, wherein at least one primitive is associated with an input queue and an output queue, each input queue receiving an inbound message and transferring the inbound message to said at least one primitive, and each output queue:

sending an outbound message to either a different primitive or a system output, and buffering the outbound message in the output queue associated with the at least one primitive until the sending of the outbound message is fully completed; and for each primitive having a state, updating the state of the primitive after fully processing each received message;

for each primitive, saving in persistent storage, at select checkpoints, any input message queue, output message queue, and state associated with such primitive; and if a failure occurs on a server in the system, restoring each primitive on such server to the input message queue, output message queue, and state, if any, saved for the primitive at the last applicable checkpoint for the primitive, where the primitive continues processing starting from such checkpoint.

2. The method of claim 1, wherein the protocol specifies that a sender of a message save a copy of the message in persistent storage until at least a recipient of the message has saved a copy of the message in persistent storage.

3. The method of claim 2, wherein the recipient of the message sends an acknowledgement to the sender after the recipient has stored the message in persistent storage.

4. The method of claim 3, wherein the recipient of the message does not send the acknowledgement until after the message has been saved at a checkpoint.

5. The method of claim 1, wherein the protocol specifies that each sender of messages assign a unique sequence number to each message sent over a connection, where messages are sent in sequence order over a connection, wherein a first unique sequence number is assigned to a given message when the given message is sent over a first connection and a second unique sequence number is assigned to the given message when the given message is sent over a second connection and wherein the first and second unique sequence numbers are different.

6. The method of claim 5, where if the sender resends a batch of messages to the recipient, the sender always resends messages within the batch in sequence order.

7. The method of claim 5, where the sequence order corresponds to the order in which the sender generates the messages it sends.

8. The method of claim 5, wherein a primitive always processes messages it receives in sequence order.

9. The method of claim 1, wherein checkpoints are not synchronized across servers.

10. The method of claim 1, where checkpoints are not synchronized across primitives on the same server.

11. The method of claim 1, where each primitive has its own checkpoint.

12. The method of claim 1, where primitives on the same server have the same checkpoints.

13. The method of claim 1, wherein, at a checkpoint for a primitive, the input message queue, output message queue, and state associated with the primitive are saved within a transaction.

14. The method of claim 1, wherein a recovered primitive eventually becomes aligned with a neighboring component in the execution plan by communicating with such neighboring component about which messages have been transmitted between the primitive and such component.

15. A system for ensuring that messages in a distributed, continuous processing system are processed in their entirety, comprising:

a continuous processing engine (CPE); and a plurality of servers, each server comprising an input queue, a processor, an output queue, a storage and a primitive having a state, wherein each primitive is associated with the input queue, the processor, the output queue and the storage, and wherein:

the input queue is configured to, in accordance with an execution plan, receive an input message, and buffer the input message until the input message is processed, the processor is configured to, in accordance with the execution plan, receive the input message from the input queue, process the input message, and update the state of the primitive after the input message is fully processed, the output queue is configured to, in accordance with the execution plan, receive an output message from the processor and buffer the output message for transfer to a system output or another primitive, and the storage is configured to store contents, at select checkpoints, of the input queue, output queue, and the state of the primitive; and wherein the continuous processing engine (CPE) is configured to:

manage pushing through messages by each of the primitives in accordance with the execution plan, the execution plan having a protocol that does not permit unprocessed messages to be permanently lost, and enable messages to be identified uniquely over a connection wherein if a failure occurs on a server in the plurality of servers, each primitive associated with the failed server is restored to the input message queue, output message queue, and state, if any, saved for the primitive at a last applicable checkpoint for the primitive, wherein the restored primitive is configured to continue processing starting from the last applicable checkpoint.

16. The system of claim 15, wherein the protocol specifies that a sender of a message save a copy of the message in persistent storage until at least a recipient of the message has saved a copy of the message in persistent storage.

17. The system of claim 16, wherein the recipient of the message sends an acknowledgement to the sender after the recipient has stored the message in persistent storage.

18. The system of claim 17, wherein the recipient of the message does not send the acknowledgement until after the message has been saved at a checkpoint.

19. The system of claim 15, wherein the protocol specifies that each sender of messages assign a unique sequence number to each message sent over a connection, where messages are sent in sequence order over a connection, wherein a first unique sequence number is assigned to a given message when the given message is sent over a first connection and a second unique sequence number is assigned to the given message when the given message is sent over a second connection, and wherein the first and second unique sequence numbers are different.

20. The system of claim 15, wherein checkpoints are not synchronized across servers.

21. The system of claim 15, wherein checkpoints are not synchronized across primitives on the same server.

22. The system of claim 15, wherein, at a checkpoint for a primitive, the input message queue, output message queue, and state associated with the primitive are saved within a transaction.

* * * * *